No. 671,156. Patented Apr. 2, 1901.
C. W. BALDWIN, Dec'd.
M. E. BALDWIN, Administratrix
ELEVATOR.
(Application filed Feb. 5, 1901.)
(No Model.)
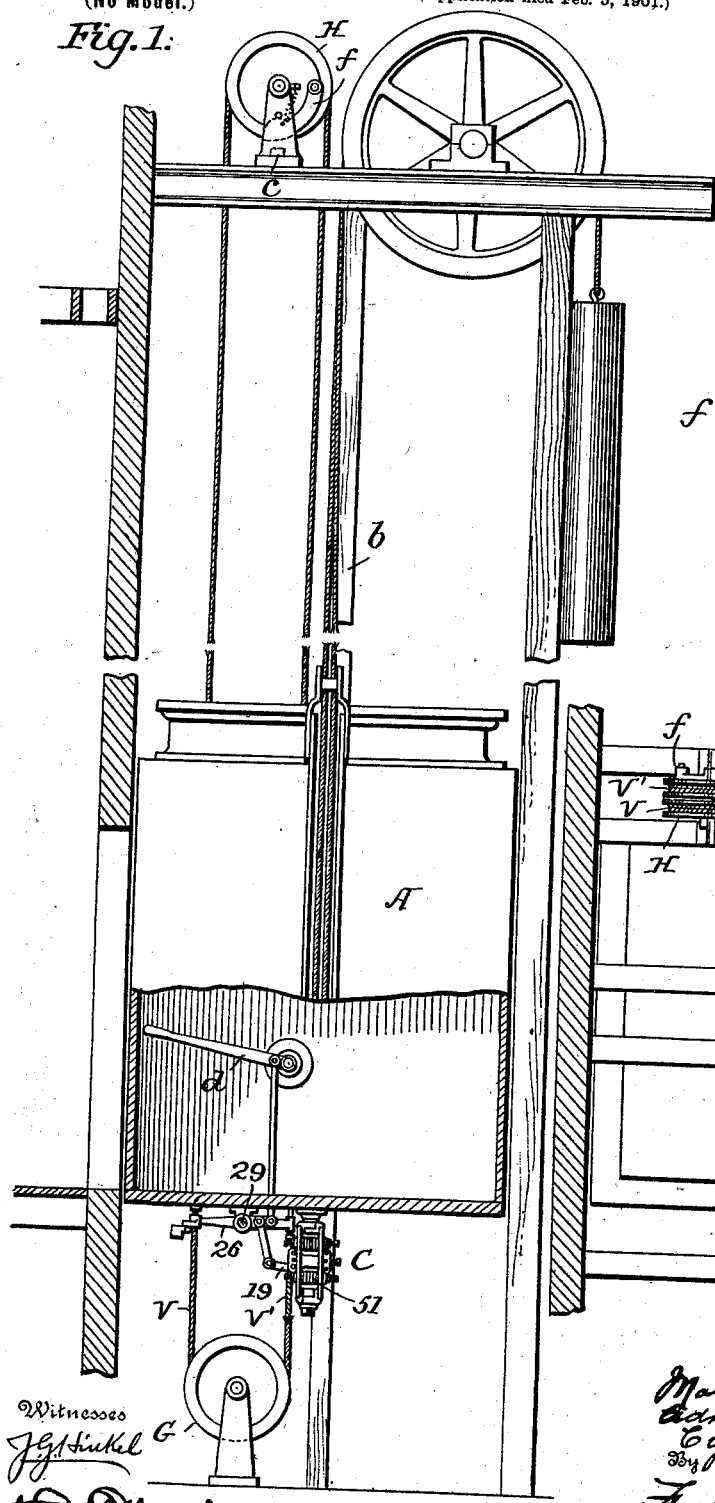
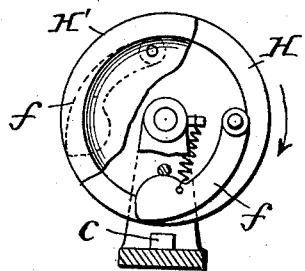
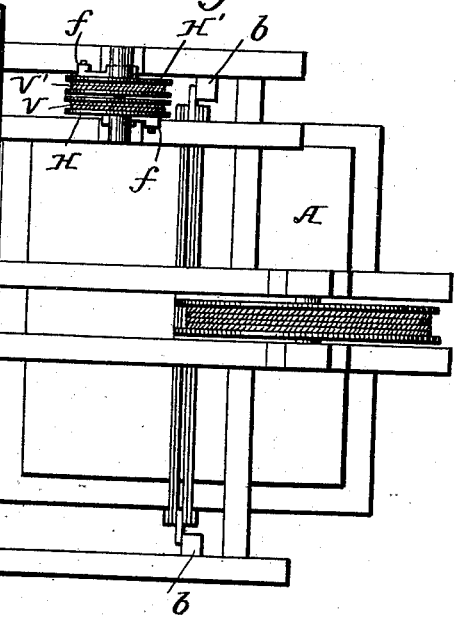

UNITED STATES PATENT OFFICE.

MARY E. BALDWIN, OF YONKERS, NEW YORK, ADMINISTRATRIX OF CYRUS W. BALDWIN, DECEASED, ASSIGNOR TO THE OTIS ELEVATOR COMPANY, OF EAST ORANGE, NEW JERSEY.

ELEVATOR.

SPECIFICATION forming part of Letters Patent No. 671,156, dated April 2, 1901.

Original application filed December 27, 1894, Serial No. 533,082. Divided and this application filed February 5, 1901. Serial No. 46,093. (No model.)

*To all whom it may concern:*

Be it known that CYRUS W. BALDWIN, deceased, late a citizen of the United States, residing at Yonkers, Westchester county, State of New York, did during his lifetime invent certain new and useful Improvements in Elevators, of which the following is a specification, the same being a division of application, Serial No. 533,082, filed December 27, 1894, of said BALDWIN.

This invention relates to safety appliances for elevator cages or platforms; and it consists in combining with the clamps or other safety appliances two governors and operating means whereby the safety devices are operated if the cage exceeds its speed in either direction.

In the accompanying drawings, Figure 1 is a sectional elevation illustrating sufficient of an elevator apparatus to illustrate the improvement. Fig. 2 is a plan view; and Fig. 3 a view, enlarged, of the rotary governors.

The cage or platform A moves under the operations of the engine between vertical guides $b$, and the cage carries clamps C, which may clamp the guides to reduce the speed or arrest the motion, or they may be opened to permit the free movement of the cage. Each clamp consists of two pivoted arms, between the inner ends of which are interposed springs 51 51, which act to carry the outer ends toward the guides, while a lever 19, when carried to either side from a central position, compresses the springs and opens the clamping ends of the guides, as shown in Letters Patent No. 416,983. The lever 19 is connected directly or indirectly with the operating-lever $d$ or other hand device in the cage. Heretofore it has been common to use a governor which acts to apply the clamps to the guides in case the cage descends too rapidly, but which has no effect in case the cage exceeds a proper rate of motion in rising. To provide against injury in either case, use is made of two governors and means whereby one will operate the safety devices when the cage moves too rapidly in one direction and the other will operate the devices if the speed in the other direction is excessive.

Different governing means may be employed with different safety devices; but, as shown, there are two rotary governors H H', each consisting of a pulley to which is pivoted a weighted dog $f$, carried inward by a spring, but thrown out by centrifugal force if the pulley exceeds a predetermined speed of rotation, and when thus thrown out strikes a stud $c$, which at once arrests the rotation of the pulley. The dog of one pulley is arranged in a reverse position to that of the other, so that one pulley can turn freely in one direction and the other can turn freely in the opposite direction. Around the two pulleys and around two pulleys G at the opposite end of the well pass two endless cables V V', and the cable V is attached at one side to the outer end of a lever 26, pivoted at 29 to the cage and connected by a link with the lever 19, and the cable V' is attached at the opposite side to the inner end of the lever 26. As a result of this arrangement if the cage exceeds its speed downward the rotation imparted to one of the pulleys H H' will cause its dog to be thrown out and arrest the rotation and the movement of the cable, so that the lever 19 is depressed and applies the brake, while the lever 19 is raised and applies the brake if the cage exceeds its proper speed upward and the dog of the other pulley is thrown out and the other cable arrested.

Without limiting the invention to the use of any special form of clamps or governors, I claim as the invention of the said C. W. BALDWIN—

1. The combination of a cage, a brake device, and means for applying the same when the cage is moving in either direction, cables traveling in opposite directions and connected with said means, and governing devices operated from said cables and constructed to arrest one of the latter when the cage is moving at undue speed in one direction, and the other when moving in the opposite direction, substantially as described.

2. The combination of a cage, a brake device, and means for applying the same when the cage is moving in either direction, cables traveling in opposite directions and connected with said means, and rotary governing devices driven by said cables and constructed to arrest one of the latter when the cage is moving at undue speed in one direction, and the other when moving in the opposite direction, substantially as described.

3. The combination with an elevator-cage, endless cables traveling in opposite directions, governor constructed to arrest one of the cables when the cage is moving at an undue speed in one direction, and the other when moving in the opposite direction, a brake device carried by the cage common to both cables, and connections between the brake device and the cables, substantially as described.

In testimony whereof I have signed my name to this specification in the presence of two subscribing witnesses.

MARY E. BALDWIN,
*Administratrix of the estate of Cyrus W. Baldwin, deceased.*

Witnesses:
HARRIET GOVAN,
W. H. BRADY.